United States Patent [19]

Bartel et al.

[11] 4,018,527

[45] Apr. 19, 1977

[54] APPARATUS FOR CONTROLLING THE MOVEMENTS OF PRINTING FILTERS

[75] Inventors: Siegfried Bartel, Gauting; Bernd Payrhammer; Johann Würf, both of Munich, all of Germany

[73] Assignee: AGFA-Gevaert, A.G., Leverkusen, Germany

[22] Filed: Mar. 10, 1975

[21] Appl. No.: 557,074

[30] Foreign Application Priority Data

Mar. 9, 1974 Germany .......................... 2411301

[52] U.S. Cl. .................................. 355/71; 355/35; 355/67

[51] Int. Cl.² ........................................ G03B 27/76

[58] Field of Search ................... 355/32, 35, 36, 37, 355/38, 67, 71

[56] References Cited

UNITED STATES PATENTS

| 3,299,773 | 1/1967 | Jasny | 355/35 |
|---|---|---|---|
| 3,458,254 | 7/1969 | Aston | 355/35 |
| 3,754,824 | 8/1973 | Weisglass et al. | 355/35 |
| 3,905,701 | 9/1975 | David | 355/71 |

*Primary Examiner*—Russell E. Adams
*Attorney, Agent, or Firm*—Michael J. Striker

[57] ABSTRACT

Apparatus for influencing the color of a beam of printing light in a photographic printer has three sets of coplanar filters which are movable into and from the path of printing light. The filters are mounted on holders in the form of slides, levers or pulleys and are pivotable or reciprocable between inner end positions in which they form a substantially uninterrupted composite filter extending across the entire beam of printing light and partially or completely retracted positions. The filters of each set are movable by separate actuating means which can move all filters of the respective set simultaneously toward or from the inner end positions. such actuating means may employ endless flexible elements, flexible elements of finite length, or rings which have cam slots for followers provided on the holders for the filters of the respective set.

25 Claims, 9 Drawing Figures

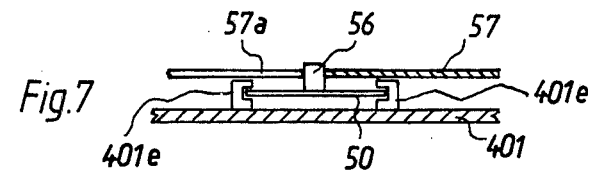
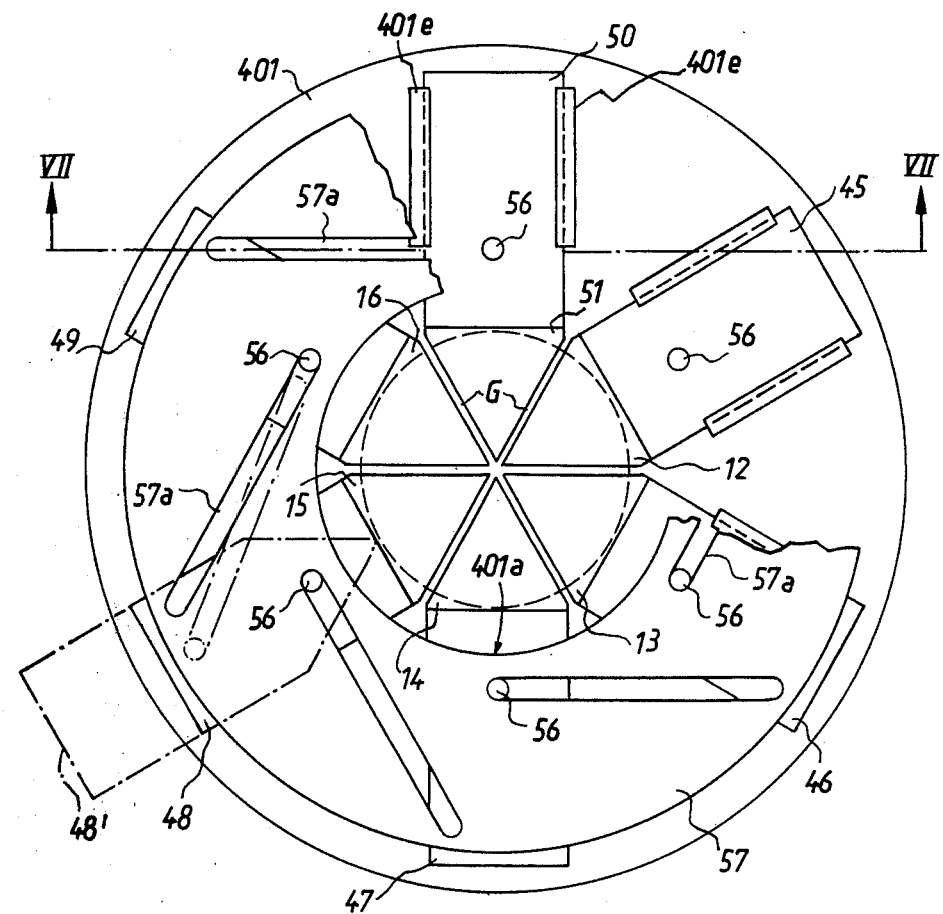

APPARATUS FOR CONTROLLING THE MOVEMENTS OF PRINTING FILTERS

BACKGROUND OF THE INVENTION

The present invention relates to machine printing of color positives from photographic color negatives, and more particularly to improvements in apparatus for continuously influencing the color of light beams in photographic color printers. Still more particularly, the invention relates to improvements in apparatus for selectively moving portions of several color filters, into the light beam which impinges upon photosensitive material in a printer.

Color casts in photographic printers are normally removed (a) by selecting the length of intervals during which corresponding filters extend into the light beam or (b) by changing the intensity of the filtering action. The first technique necessitates substantial expenditures for equipment which is used to move filters into the light beam while the latter impinges upon photosensitive material; moreover, such technique presents serious problems when the exposures are being made in rapid succession because the interval during which the filters are being moved into the light beam cannot exceed a predetermined fraction of the exposure time.

The second technique (intensity regulation) necessitates the utilization of packs or stacks of filters which are stored in a so-called filter drawer and whose transparency or light transmissivity is proportional with the degree of cast which is to be removed from the light beam. Proper filtering of printing light necessitates the utilization of groups consisting of large numbers of filters in each of three complementary colors, and the density of filters in each group varies only slightly from filter to filter so as to insure that each group will furnish a complete spectrum of different densities. The initial cost of such groups of filters is high and the removal of color casts by resorting to groups of filters takes up a substantial amount of time. Therefore, the just-described intensity regulation technique is employed practically exclusively in relatively or extremely simple printers wherein the output is of secondary importance.

It is also possible to employ filters of maximum density and to install such filters in an unoccupied (structure-free) plane of the beam of printing light. Depending on the desired filtering effect, selected filters are moved into such plane to a greater or lesser extent. An unoccupied plane which is highly satisfactory for the mounting of movable maximum density filters therein is the focal plane of the objective because a filter which is mounted in the focal plane can influence all points of the copying plane to the same degree. However, many printers do not provide enough room for the mounting of a complete filter assembly in the focal plane of the objective. It is therefore customary to place the filter assembly immediately behind the light source in front of the positive. In order to homogenize the light beam before it reaches the positive, a mixing duct is placed between the filter assembly and the copying plane. The purpose of the duct is to insure a uniform distribution of light in the three colors across the entire beam of printing light. The length of the mixing duct is greater if the distribution of colors in the light beam immediately behind the filter assembly is non-uniform, i.e., the duct can be made shorter if the filters influence the beam in such a way that the beam is substantially homogeneous as soon as it has passed through the selected filter or filters.

SUMMARY OF THE INVENTION

An object of the invention is to provide novel and improved filters for use in a photographic printer, especially in an automatic printer which is designed to make prints from color negatives.

Another object of the invention is to provide a relatively simple, compact, rugged and easy-to-operate apparatus for controlling the movements of filters in a photographic printer.

A further object of the invention is to provide an apparatus of the just outlined characters which renders it possible to repeatedly move color filters into the light beam with a high degree of accuracy and reproducibility and which insures that the light beam is at least substantially homogeneous as soon as it advances beyond the filters.

An additional object of the invention is to provide an apparatus which comprises improved printing filters and actuating means for effecting controlled movements of filters into, in and out of the beam of light which has passed through or has been reflected by an original (e.g., a color negative) and is to impinge upon a layer of photosensitive material in a copying plane.

The improved apparatus can be used for continuously coloring a light beam, particularly in a photographic printer wherein a beam of printing light (e.g., a cylindrical beam) passes in a predetermined direction along a predetermined path toward a plane wherein the beam impinges on photosensitive material, e.g., an emulsion on a web of paper which is to yield reproductions of color photographic negatives.

The apparatus comprises a plurality of sets of discrete filters, and the sets of filters are disposed one behind the other, as considered in the direction of travel of the beam of printing light. The filters of each set are preferably coplanar and are movable transversely of the path to and from inner end positions or operative positions in which such filters extend at least substantially across the entire path. The apparatus further comprises discrete actuating means for each set of filters, and each actuating means comprises a device for simultaneously moving all filters of the respective set toward and away from the inner end positions.

The filters of each set preferably have substantially triangular portions which extend across the path in the inner end positions of the filters so that the triangular portions of the filters constitute the sectors of a composite filter. Each triangular portion may constitute an entire filter, and the apparatus preferably comprises discrete holders (e.g., pivotable levers, rotary pulleys or reciprocable slides) for the filters of each set. Each filter may be mounted in its holder in overhung position, i.e., in cantilever fashion.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a plan view of a fifth apparatus, with certain parts partially broken away;

FIG. 7 is a fragmentary sectional view as seen in the direction of arrows from the line VII—VII of FIG. 6;

DESCRIPTION OF THE PREFERRED EMBODIMENTS

Figure 1:
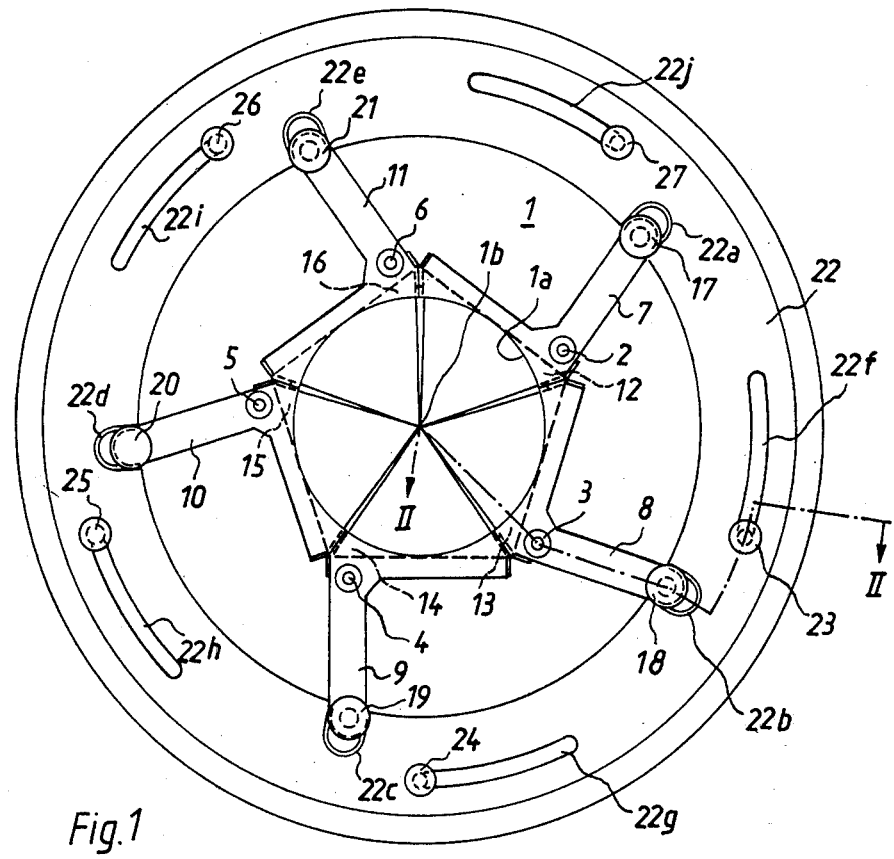
FIG. 1 is a plan view of an apparatus which embodies one form of the invention.

Referring first to FIG. 1, there is shown an apparatus which comprises a circular plate-like support 1 having a centrally located circular opening or aperture 1a. The center 1b of the opening 1a is assumed to be located on the axis of a beam of printing light which (in the region of the support 1) is assumed to constitute a circular cylinder and passes in a direction at right angles to the plane of FIG. 1. The support 1 carries five pivot members 2, 3, 4, 5, 6 (e.g., rivets or bolts) for five discrete holders here shown as bell crank levers 7, 8, 9, 10, 11 each of which can turn about the axis of the respective pivot member, i.e., about an axis which is substantially parallel to the direction of travel of the light beam. Each of the holders or levers 7-11 is mounted on the respective pivot member by means of washers (see FIG. 2), elastic split rings or the like so as to be held against movement in the axial direction of the associated pivot member as well as against excessive wobbling.

Each of the levers 7– has an elongated groove (see the groove 8a of the lever 8 in FIG. 2) for one marginal portion of a color filter or printing filter which is held in the respective groove by a mass of putty or another type of cement. The color filters which are mounted in the levers 7-11 are respectively shown at 12, 13, 14, 15 and 16 and each thereof has a substantially triangular outline. When the levers 7-11 assume the end positions which are shown in FIG. 1, the free tips or apices of the filters 12-16 extend all the way or very close to the center 1b of the aperture 1a in the support 1, i.e., the filters 12-16 of the set of five filters can be said to constitute a composite filter which practically completely overlies the aperture 1a.

The color filters or printing filters 12-16 are mounted in the inner or first arms of the respective bell crank levers 7-11. The second or outer arms of the levers 7-11 carry roller followers 17, 18, 19, 20, 21 which extend into substantially radial cam slots 22a, 22b, 22c, 22d, 22e machined into a ring-shaped actuating or control member 22 (hereinafter called ring) adjacent to one side of the support 1. The ring 22 is further formed with arcuate slots 22f, 22g, 22h, 22i, 22j whose centers of curvature are located on the axis of the light beam passing through the aperture 1a and which respectively receive the shanks of guide bolts 23, 24, 25, 26, 27 secured to the support 1. The heads of the bolts 23-27 or washers on the shanks of these bolts hold the ring 22 against axial movement in a direction away from the adjacent side of the support 1.

Figure 2:
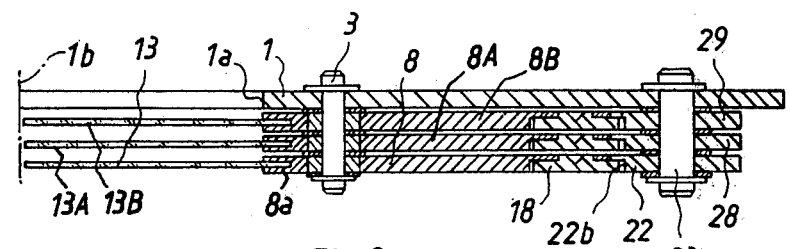
FIG. 2 is an enlarged fragmentary sectional view as seen in the direction of arrows from the line II-II of FIG. 1.

FIG. 2 shows that the bolts 23-27 guide three actuating rings, namely, the aforementioned ring 22 and two additional rings 28, 29 which are concentric with the ring 22 and with the support 1. Also, each of the pivot members 2-6 supports three holders or bell crank levers and each of these levers carries a differently colored triangular printing filter. FIG. 2 merely shows the levers 8A and 8B which are pivotable on the member 3 with and relative to the lever 8, and the filters 13A, 13B which are respectively mounted in grooves provided therefore in the inner arms of the levers 8A, 8B.

The filters which are used in the apparatus of FIGS. 1 and 2 are preferably interference filters, i.e., the levers may carry filters in the subtractive primaries cyan, magenta and yellow. For example, the levers 7011 may carry a set of cyan filters, the levers which are pivotable by the ring 28 may carry a set of magenta filters, and the levers which are pivotable by the ring 29 may carry a set of yellow filters. Each set of filters blocks a certain range of the color spectrum as completely as possible without influencing the remaining range of the spectrum.

The operation:

A color negative (or a film containing a series of negatives) which is to be reproduced is evaluated in a manner well known from the art of photographic printers. This enables the printer to weaken the color light streams in the individual colors with respect to each other so as to obtain satisfactory reproductions of the respective originals. The actuating rings 22, 28 and 29 are rotated relative to the support 1 to the extent which is necessary to insure that the filters 12-16 carried by the levers 7-11 overlie a certain portion of the aperture 1a (or the entire aperture 1a), that the filters carried by levers which are pivotable by the ring 28 overlie a certain portion of the aperture 1a, and that the filters carried by levers which are pivotable by the ring 29 also overlie a certain portion of the aperture 1a. Each set of filters can overlie the entire aperture 1a, a relatively small or relatively large portion of the aperture, or may be completely withdrawn from the beam of printing light. Eventual non-uniformity in the distribution of printing light which has passed through the aperture 1a are eliminated by causing the light beam to pass through a relatively short mixing duct of conventional design (not shown) before the light beam impinges upon photosensitive material. The mixing duct need not be long because the aforedescribed mounting of filters in the three colors insures that the light beam which has passed through the three sets of filters is at least substantially homogeneous. The selection of angular positions of rings 22, 28, 29 with respect to the support 1 is completed prior to the making of prints; therefore, such selection can take up a certain amount of time which may be much longer than the time which is available for the movement of filters into the beam of printing light in printers wherein the color casts are removed by selecting the length of intervals during which the filters extend into the light beam. In other words, the angular positions of the rings 22, 28 and 29 are selected during the intervals between the making of successive reproductions or groups of reproductions. The angular positions of rings 22, 28, 29 can be changed while the printer is idle or while the printer moves an unexposed portion of photosensitive material into register with the aperture 1a of the support 1; in the latter instance, the printer can make a much larger number of reproductions per unit of time.

When the filters 12–16 of a set of filters are moved to partially retracted positions, the composite filter including such set of filters is broken up into light-transmitting and light-intercepting portions. Such light-transmitting and light-intercepting portions of the composite filter are distributed over the area of the aperture 1a (i.e., across the beam of printing light); this is highly desirable because the non-uniformity of color distribution is relatively small so that a short mixing duct suffices to homogenize printing light before the latter reaches the photosensitive material.

Figure 3:
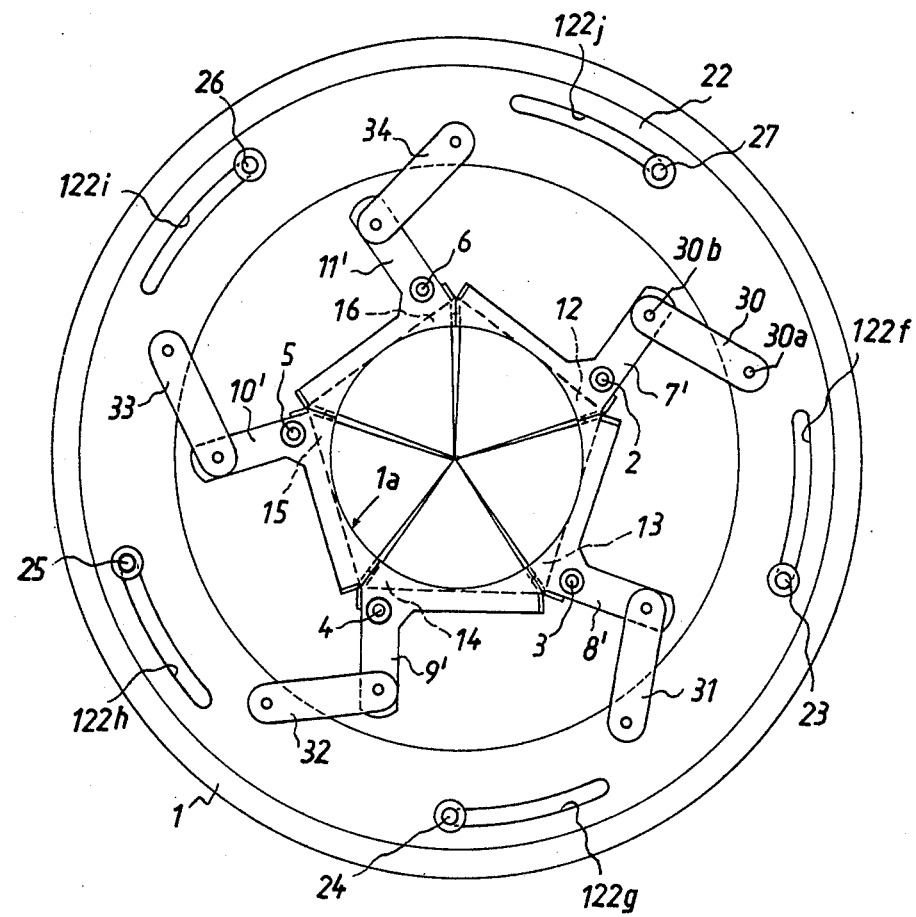
FIG. 3 is a plan view of a second apparatus.

FIG. 3 shows a modified apparatus wherein the actuating ring 122 has arcuate slots 122f–122j for guide bolts 23–27 of the support 1. The outer arms of holders or bell crank levers 7'–11' for the filters 12–16 are articulately connected to the ring 122 by means of links 30, 31, 32, 33 and 34. In all other respects, the apparatus of FIG. 3 is or can be identical with the apparatus of FIGS. 1–2, i.e., each of the pivot members 2–6 carries three bell crank levers and each of the three levers carries a triangular filter in one of three subtractive primaries. The pins by means of which the links 30–34 are articulately connected with the ring 122 and with the respective levers 7'–11' are parallel to the axis of the light beam passing through the central aperture 1a of the support 1. FIG. 3 merely shows the pins 30a, 30b for the link 30.

Figure 4:
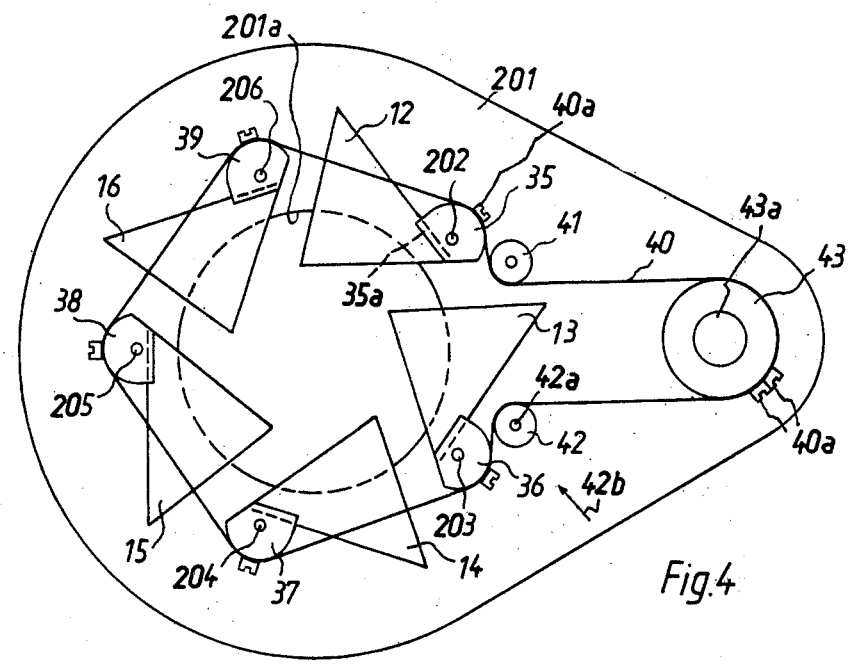
FIG. 4 is a plan view of a third apparatus.

FIG. 4 shows a third apparatus wherein the bell crank levers are replaced by different holders, 35, 36, 37, 38, 39 for the triangular filters 12–16. The holders 35–39 are turnable on or with pivot members 202, 203, 204, 205, 206 which are secured to a plate-like support 201. The latter is substantially circular and has a circular aperture 201a for the beam of printing light. The means for actuating the holders 35–39 comprises an endless flexible element 40 (e.g., a fine steel cord or a flat textile belt) which is secured to the holders by screws 40a or analogous fasteners and is further trained over a rotary driver pulley or sheave 43 mounted on a shaft 43a which is secured to the support 201. Two additional screws 40a secure the flexible element 40 to the pulley 43. The flexible element 40 is further trained over two deflecting rollers or sheaves 41, 42 at least one of which may constitute a tensioning means for the flexible element. For example, the shaft 42a of the roller 42 can be mounted in a slot of the support 201 and the shaft 42a can be biased (by a helical spring or the like) in the direction indicated by arrow 42b.

Each of the holders 35–39 may constitute a portion of a sheave, roller or pulley, and each thereof has a groove (see the groove 35a of the holder 35) for a part of a marginal portion of the respective triangular filter so that the latter is mounted in cantilever fashion. The filters 12–16 may be bonded to the respective holders 35–39 by means of putty or another suitable cement. The screws 40a insure that the flexible element 40 cannot slip with respect to the holders 35–39 and/or pulley 43.

By rotating the pulley 43 on or with the shaft 43a, one can change the angular positions of the holders 35–39 whereby the filters 12–16 are pivoted to the same extent (about the axes of the respective pivot members 202–206) so that they overlie a larger or smaller portion of the aperture 201a. It is clear that the support 201 carries three sets of holders and that each set of holders supports a set of triangular filters in a different one of three subtractive colors. Each set of holders can be rotated by a discrete endless flexible element, together with or independently of the other set(s) of holders. The apparatus of FIG. 4 is simpler and less expensive than the apparatus of FIGS. 1–2 or FIG. 3.

Figure 5:
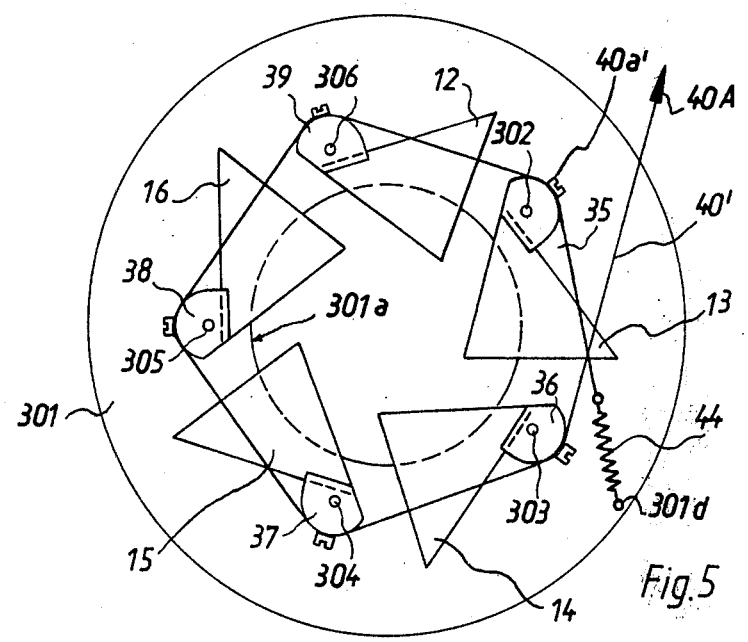
FIG. 5 is a plan view of a fourth apparatus which constitutes a first modification of the apparatus shown in FIG. 4.

The apparatus of FIG. 5 constitutes a first modification of the apparatus of FIG. 4. It comprises a circular plate-like support 301 having a central aperture 301a and being provided with five equally spaced pivot members 302, 303, 304, 305, 306 for holders 35–39 which carry triangular filters 12–16. The actuating means for changing the angular positions of filters 12–16, always to the same extent, comprises a flexible element 40' which is of the finite length and is secured to the holders 35–39 by screws 40a' or analogous fasteners. One end of the flexible element 40' is secured to one end of a resilient element here shown as a helical spring 44 the other end of which is secured to a post 301d of the support 301. The other end of the flexible element 40' can be pulled (see the arrow 40A) to pivot the filters 12–16 outwardly (i.e., out of positions of overlap with the aperture 301a). When the tensional stress upon the flexible element 40' is relaxed, the spring 44 contracts and moves the filters 12–16 to their inner end positions in which the filters overlap the aperture 301a, either completely or nearly completely.

It is clear that the flexible element 40' and spring 44 can be mounted in such a way that the spring biases the filters 12–16 to their outer end positions in which the aperture 301a is fully exposed, i.e., that a pull upon the flexible element 40' results in movement of free apices of the filters 12–16 toward the center of the aperture in the support 301.

Suitable means for moving or effecting controlled movements of the actuating rings of FIGS. 1–3 or of the flexible elements of FIGS. 4–5 are disclosed, for example, in the commonly owned German Offenlegungsschrift No. 2,048,606.

In each of the heretofore described embodiments of the improved apparatus, a composite filter in a particular subtractive color comprises a set of five triangular filters which are disposed in a common plane. A composite filter consisting of five discrete filters which are pivotable with respect to each other is preferred at this time because such number of filters is the minimum number necessary to insure that the filters can practically completely overlap the circular aperture of the support and that they can be pivoted between their end positions in a common plane without any interference with each other.

It is clear that the filters of a color can be mounted in such a way that they partially overlap each other in the one or the other end position. For example, if the filters in a particular color are not coplanar with each other, their number can be increased to six or more to thus insure a complete overlapping of the aperture in the support when the filters assume their inner end positions. However, since each of the filters must have a certain thickness (as a rule, each filter comprises a plate of glass or plastic which is coated with or has embedded therein a material capable of intercepting a particular portion of the spectrum), the placing of filters of the same color into different planes would contribute significantly to the thickness of the apparatus, as considered in the direction of travel of the beam of printing light. Therefore, it is preferred to use fewer filters but to place all filters of a given color into a single plane. Moreover, the fact that five triangular filters might not completely overlie the aperture of the support (i.e., that some light can pass between the triangular filters when such filters assume their inner end positions) is of no consequence as far as the quality of the reproductions is concerned. This is due to the fact that very few (if any) color negatives are of such nature that they do not require any light intensity in one or more colors.

FIGS. 6 and 7 show a further apparatus wherein six triangular filters 12-16 and 51 of a given color are movable substantially or exactly radially of the circular aperture 401a in a circular plate-like support 401. To this end, the filters 12-16 and 51 are respectively mounted in plate-like holers or slides 45, 46, 47, 48, 49, 50 which are reciprocable in pairwise arranged guide rails or ways 401e of the support 401. The means for actuating the filters 12-16 and 51 (i.e., for moving these filters into and from the path of light passing through the aperture 401a) comprises a ring 57 having inclined elongated cam slots 57a for pin-shaped followers 56 secured to or made integral with the slides or holders 45-50. The cam slots 57a need not be straight and their inclination with respect to the paths of movement of the respective holders may be changed in order to effect a desired rate of movement of holders 45-50 radially of the support 401 in response to rotation of the ring 57 at a selected speed.

When the ring 57 is rotated clockwise, as viewed in FIG. 6, the filters 12-16 and 51 move radially outwardly of the support 401. It is preferred to move all of the filters to the same extent, either toward their inner end positions (substantially as shown in FIG. 6 by solid lines) or to their outer end positions (see the position 48' of the holder 48) in which the aperture 401a is completely or nearly completely exposed. The width of gaps G between the filters 12-16 and 51 in the inner end positions of such filters is zero or minimal so that a relatively short mixing shaft suffices to homogenize the light which has passed through the aperture 401a on its way toward a photosensitive material. Each of the gaps G shown in FIG. 6 extends from the center of the aperture 401a and all the way to the edge face which surrounds the aperture. It has been found that the cost of mixing means for homogenizing printing light which has passed through the apparatus of the present invention is a small fraction of the cost of mixing means in printers which employ conventional apparatus for moving filters into and from the path of printing light.

Figure 8:
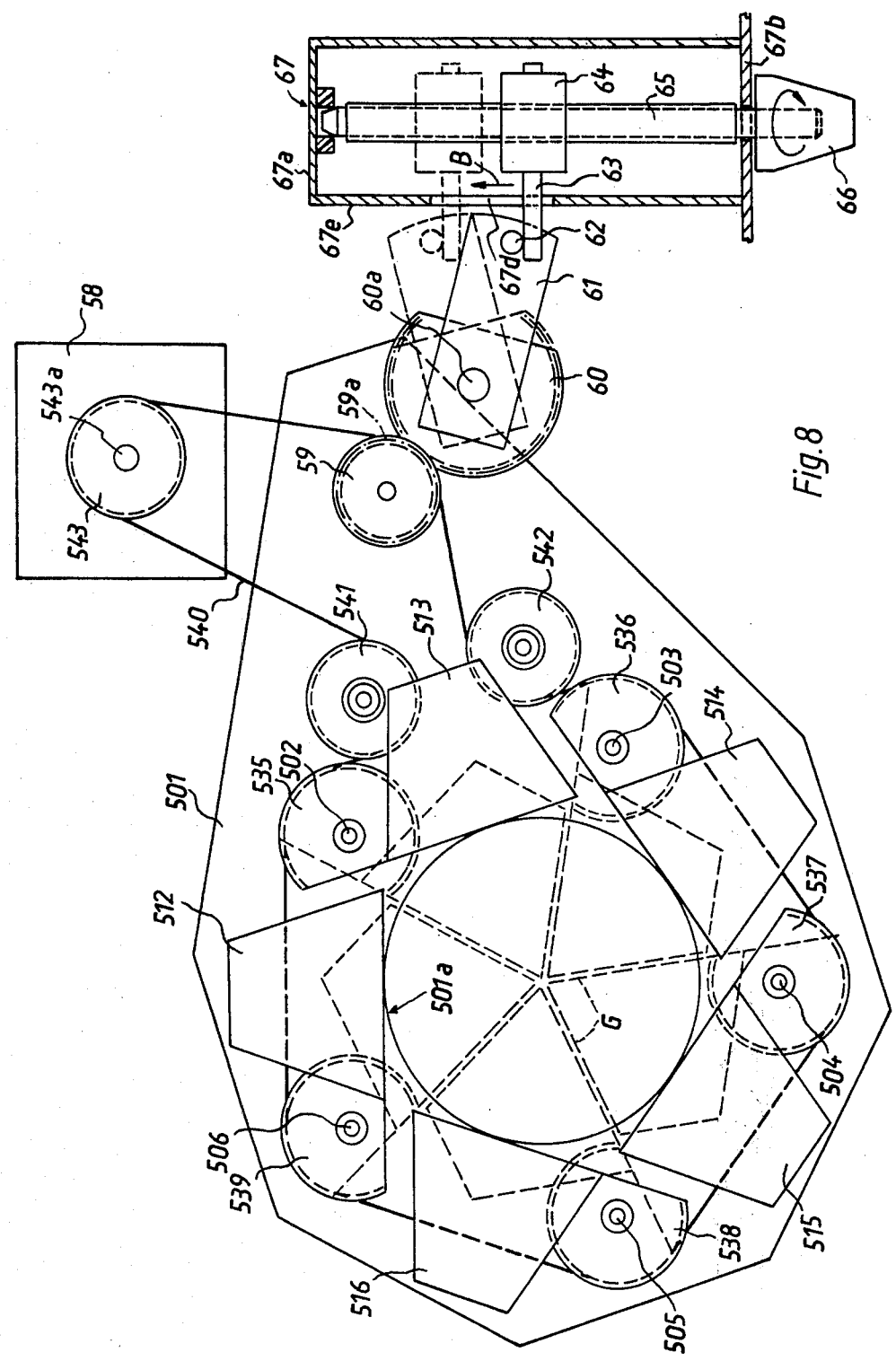
FIG. 8 is a partial plan and partial sectional view of a sixth apparatus which constitutes a second modification of the apparatus shown in FIG. 4.

The apparatus of FIG. 8 has a plate-like support 501 of polygonal outline with a circular aperture 501a. In many respects, the apparatus of FIG. 8 is similar to that shown in FIG. 4 and, therefore, many of its parts are denoted by reference characters similar to those used in FIG. 4 plus 500. Thus, the holders are shown at 535-539, the endless flexible element of actuating means at 540, the filters at 512-516, the driver pulley at 543, the deflecting rollers at 541, 542, and the pivot members for the holders at 502 to 506.

The means for changing the angular position of the driver pulley 543, and for thereby rotating the holders 535-539 clockwise or counterclockwise comprises a rotary electromagnet 58 whose armature directly or indirectly turns the shaft 543a of the pulley 543. The electromagnet 58 may but need not be mounted on the support 501. This electromagnet receives signals from an electrical control unit of known design, not forming part of the present invention. The arrangement is preferably such that, when the electromagnet 58 is energized, it causes the holders 535-539 to rapidly turn in clockwise direction so as to move the respective filters 512-516 into the path of printing light passing through the aperture 501a. The relatively slow movement of filters 512-516 to their retracted or non-obstructing positions is effected by a suitable spring (not shown) which opposes clockwise rotation of the pulley 543 and tends to maintain the filters 512-516 in the positions indicated by solid lines. The endless flexible element 540 is further trained around an auxiliary roller 59 which is coaxial with a gear 59a meshing with a gear or gear segment 60 rigid with a shaft 60a which is further rigid with a pivotable arm 61 having a projection 62. The shaft 60a rotates in a frame (not shown) which supports the member 501 and electromagnet 58. The projection 62 of the arm 61 cooperates with a lateral extension or stop 63 on a spindle nut 64 whose position can be changed by a feed screw 65 journalled in the end walls 67a, 67b of a housing 67. One end portion of the feed screw 65 extends from the housing 67 and carries a knob 66 which can be rotated by hand to thereby move the spindle nut 64 in or counter to the direction indicated by arrow B. The spindle nut 64 cannot rotate in response to rotation of the feed screw 65 because its extension passes through a relatively narrow elongated slot 67d provided in one side wall 67e of the housing 67.

Figure 9:
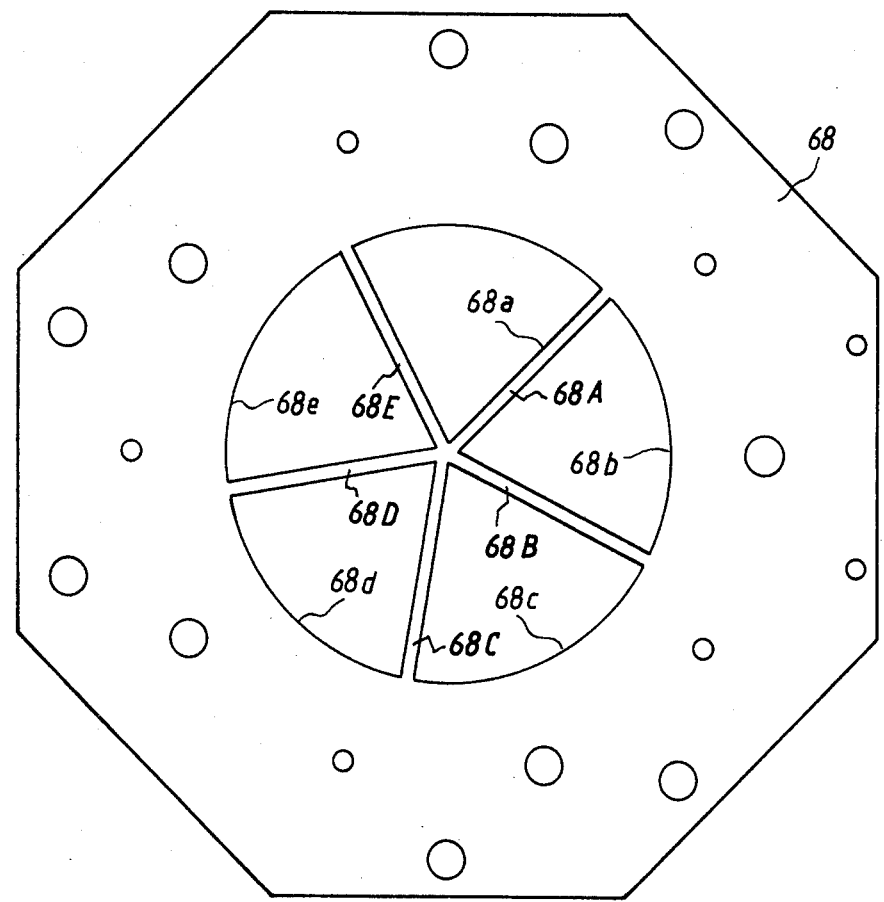
FIG. 9 is a plan view of a component of the apparatus shown in FIG. 8.

FIG. 9 shows a plate-like diaphragm 68 which is mounted at the underside of the support 501 (as viewed in FIG. 8) and has five sector-shaped cutouts 68a, 68b, 68c, 68d, 68e separated from each other by narrow webs 68A-68E. The cutouts 68a-68e can be fully overlapped by triangular portions of the substantially trapezoidal filters 512-516 when the filters assume their inner end positions indicated in FIG. 8 by broken lines. The cutouts 68a-68e are located behind the aperture 501a. The webs 68A-68E together resemble a star-shaped five-pronged structure and register with the gaps G (shown in FIG. 8) which develop between neighboring filters 512-516 when the filters are moved to their broken-line positions. Thus, when the filters 512-516 move to their inner end positions, the apparatus of FIG. 8 compels the entire light beam to pass through the filters or to be reflected by the relatively narrow webs 68A-68E.

The operation of the apparatus which embodies the structure of FIGS. 8 and 9 is as follows:

The apparatus is installed in a printer wherein the control unit determines the length of intervals during which the filters are located in the path of printing light. This apparatus is used together with two similar or identical apparatus each of which has a set of five filters in the other two subtractive colors. The three apparatus are disposed one behind the other, and the filters of each of the three apparatus are movable independently of the filters in the other two apparatus. During calibrating of the apparatus, i.e., when the apparatus are adjusted to insure an equalization of light intensity in the particular colors on the basis of exposure time for a calibrating negative, the knobs 66 are rotated so as to move the respective arms 61 to predetermined angular positions in which the arms limit the extent of movement of the respective set of filters to their retracted positions. In other words, the filters 512–516 of each of the three apparatus allow a certain amount of printing light to pass through the apertures of the corresponding apertures 501a without passing through the respective filters. As a rule, the adjustment will be such that the composite filter is fully opened for that color in which the intensity of the light source is least pronounced and that the filters of the other two composite filters are moved to partially opened positions.

Once the three apparatus are calibrated or initially adjusted in the just-described manner, the filters are moved to their open positions (to the extent determined by the respective spindle nuts 64) prior to start of a printing operation. The shutter (not shown) of the printer is thereupon opened to permit the passage of a beam of printing light, whereby the negative (original) is imaged onto the photosensitive material by light which has been influenced by the filters in the three units of the apparatus. Thus, the selected positions of the three composite filters determine the color composition of printing light. At the same time, a conventional photoelectronic evaluating circuit measures the quantity of light in each of the three colors. When the evaluating circuit furnishes a signal which indicates that the photosensitive material has been exposed to a requisite amount of light in a particular color, the corresponding electromagnet 58 is energized to rapidly move the respective filters 512–516 to their inner end positions in which the filters cooperate with the webs 68A–68E of the associated diaphragm 68 to prevent the passage of additional light in the particular color. The diaphragms 68 render it possible to simplify the construction of the apparatus, i.e., to insure that the apparatus can completely block the passage of light in the corresponding colors even through the filters 512–516 of the respective set define between themselves gaps G which would allow some light to pass the respective unit even when the filters assume the inner end positions shown in FIG. 8 by broken lines. The evaluating circuit thereupon causes the other two electromagnets to move the respective filters to their inner end positions (either simultaneously or one after the other) whereby the exposure is completed and the shutter closes to allow the filters of the three sets to move back to their retracted positions (to the extent determined by the respective spindle nuts 64) while the shutter prevents the printing light from reaching the photosensitive layer which is being moved lengthwise or replaced by an unexposed layer before the shutter opens again to enable the printer to make a further exposure. Thus, the electromagnets 58 are deenergized when the shutter is closed so that the filters can return to their retracted positions under the influence of the aforementioned springs which tend to move the flexible elements 540 in directions to pivot the respective filters 512–516 counterclockwise, as viewed in FIG. 8, i.e., out of positions of overlap with the respective apertures 501a. The extent to which the filters of a set can be limited is determined in advance by appropriate selection of the axial positions of corresponding spindle nuts 64. The filters of each of the three sets of filters can move to different starting or retracted positions. The next exposure can be made as soon as a fresh original and a fresh unexposed positive are placed into register with the apertures 501a of the three apparatus. The knobs 66 can be rotated prior to the making of each of a series of exposures or they remain untouched if the selected adjustment of corresponding spindle nuts 63 is satisfactory for the making of exposures from two or more successive originals or for the making of several exposures of a single original.

A photoelectric evaluating circuit which can be used to energize and deenergize the electromagnets 58 is disclosed, for example, in German Pat. No. 972,204. As mentioned above, the evaluating circuit determines the length of intervals during which the filters of the three sets remain in their retracted or starting positions corresponding to the solid-line positions of filters 512–516 shown in FIG. 8.

The apparatus of FIG. 8 preferably embodies actuating means (including the endless flexible element 540) of the type shown in FIG. 4 because the combined mass of moving parts is small so that the filters 512–516 can be rapidly moved to their inner end positions. It is clear, however, that the limiting means including the parts 59–67 can be used with equal advantage in combination with the apparatus of FIGS. 1–2, FIG. 3, FIG. 5 or FIGS. 6–7.

Moreover, the principle of terminating the exposure in a particular color by using a composite filter whose filters extend partially across the beam of printing light during exposure and are moved all the way into the path of the beam in order to terminate the exposure can be resorted to in other types of printers. For example, a composite filter may consist of only two discrete filters, especially if the printer is equipped with satisfactory means for homogenizing the light beam in the region between the filters and the plane for the photosensitive material. Referring to FIG. 6, the filters 12, 13 and 51 can be replaced with a single filter which is reciprocable by the holder 45, and the filters 14–16 can be replaced by a single filter which is reciprocable by the holder 48.

Without further analysis, the foregoing will so fully reveal the gist of the present invention that others can by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for continuously coloring a light beam, particularly in a photographic printer wherein a beam of printing light passes in a predetermined direction along a predetermined path toward a plane wherein the beam impinges on photosensitive material, comprising a plurality of sets each composed of a plurality of discrete filters, said sets being disposed one behind the other, as considered in said direction, and the filters of each set being movable transversely of said path to and from inner end positions in which such filters extend at least substantially across the entire path; and discrete actuating means for each of said sets of filters, each of said actuating means comprising a device for simultaneously moving all filters of the respective set toward and away from said inner end positions.

2. Apparatus as defined in claim 1, wherein said filters of each of said sets have substantially triangular portions which extend across said path in said inner end positions of the filters so that the triangular portions of filters in said inner end positions constitute the sectors of a composite filter.

3. Apparatus as defined in claim 1, further comprising discrete holders for the filters of said sets, said holders being outwardly adjacent to the path of the light beam and the filters being mounted in the respective holders in overhung positions.

4. Apparatus as defined in claim 3, wherein each of said holders comprises a lever and pivot means for said lever, said pivot means defining for the respective levers pivot axis which are substantially parallel to said direction.

5. Apparatus as defined in claim 4, wherein each of said levers is a bell crank lever having a first arm which supports the respective filter and a second arm, said devices of said actuating means being operatively connected with the second arms of said levers.

6. Apparatus as defined in claim 3, wherein said holders are movable substantially radially of the light beam in said path and each of said devices comprises means for reciprocating the respective holders.

7. Apparatus as defined in claim 3, further comprising means for limiting the extent of movement of the filters of each of said sets from said inner end positions.

8. Apparatus as defined in claim 7, wherein said limiting means comprises a discrete limiting unit for each of said sets of filters and each of said units cooperates with said device of the respective actuating means.

9. Apparatus as defined in claim 1 further comprising a diaphragm adjacent to each of said sets of filters and wherein said filters of each of said sets have portions which extend across said path in said inner end positions of the filters so that triangular portions of said filters in said inner end positions are delineated by said respective adjacent diaphragms and constitute the sectors of a composite filter, each neighboring filters of a set being separated from each other by relatively narrow gaps, said adjacent diaphragms having webs which register with said gaps in the inner end positions of the respective filters whereby said diaphragms cooperate with the associated set of filters to completely block the passage of light in the respective color.

10. Apparatus as defined in claim 9, wherein each of said diaphragms is stationary and is immediately adjacent to the filters of the respective set.

11. Apparatus as defined in claim 10, further comprising a discrete plate-like support for each of said sets of filters, the filters of each set being disposed at one side of the respective support and said diaphragms being disposed at the other sides of the respective supports.

12. Apparatus as defined in claim 10, wherein the filters of each of said sets are disposed in a common plane.

13. Apparatus as defined in claim 1, wherein the number of said sets of filters is three and the colors of said filters are the subtractive primaries.

14. Apparatus as defined in claim 1, further comprising a common support for the filters of at least one of said sets.

15. Apparatus for continuously coloring a light beam, particularly in a photographic printer wherein a beam of printing light passes in a predetermined direction along a predetermined path toward a plane wherein the beam impinges on photosensitive material, comprising a plurality of sets of discrete filters, said sets being disposed one behind the other, as considered in said direction, and the filters of each set being movable transversely of said path to and from inner end positions in which such filters extend at least substantially across the entire path; discrete actuating means for each of said sets of filters, each of said actuating means comprising a device for simultaneously moving all filters of the respective set toward and away from said inner end positions, and discrete holders for the filters of said sets outwardly adjacent to the path of the light beam and the filters being mounted in the respective holders in overhung positions, said holders being rotatable about axes extending in substantial parallelism with said direction and each of said actuating means comprising a flexible element trained over the respective holders and movable lengthwise to thereby rotate the respective holders with the corresponding filters.

16. Apparatus as defined in claim 15, wherein each of said holders constitutes at least a portion of a pulley.

17. Apparatus as defined in claim 15, further comprising fastener means for securing said flexible elements to the respective holders.

18. Apparatus as defined in claim 15, wherein each of said flexible elements is an endless flexible element and each of said devices further comprises a rotary driver member for the respective endless flexible element, said flexible elements being trained over the respective driver members.

19. Apparatus as defined in claim 15, wherein each of said flexible elements is of finite length and has a first and second end portion, each of said devices further comprising resilient means connected with one end portion of the respective flexible element so that a pull upon the other end portion of a flexible element for the purpose of rotating the respective holders results in stressing of the respective resilient means.

20. Apparatus as defined in claim 19, further comprising support means, said resilient means being secured to said support means.

21. Apparatus for continuously coloring a light beam, particular in a photographic printer wherein a beam of printing light passes in a predetermined direction along a predetermined path toward a plane wherein the beam impinges on photosensitive material, comprising a plurality of sets of discrete filters, said sets being disposed one behind the other, as considered in said direction, and the filters of each set being movable transversely of said path to and from inner end positions in which such filters extend at least substantially across the entire path; discrete actuating means for each of said sets of filters, each of said actuating means comprising a device for simultaneously moving all filters of the respective set toward and away from said inner end positions and each of said devices comprising an electromagnet which is energizable to rapidly move the respective filters to said inner end positions thereof; discrete holders for the filters of said sets, said holders being outwardly adjacent to the path of the light beam and the filters being mounted in the respective holders in overhung positions; and means for limiting the extent of movement of the filters of each of said sets from said inner end positions, including a discrete limiting unit for each of said sets of filters, each of said units cooperating with said device of the respective actuating means.

22. Apparatus as defined in claim 21, wherein each of said devices further comprises an endless flexible element and each of said limiting units comprises an adjustable stop for limiting the extent of movement of said flexible element in a direction to move the respective filters from said inner end positions thereof.

23. Apparatus for continuously coloring a light beam, particularly in a photographic printer wherein a beam of printing light passes in a predetermined direction along a predetermined path toward a plane wherein the beam impinges on photosensitive material, comprising a plurality of sets of discrete filters, said sets being disposed one behind the other, as considered in said direction, and the filters of each set being movable transversely of said path to and from inner end positions in which such filters extend at least substantially across the entire path; discrete actuating means for each of said sets of filters, each of said actuating means comprising a device for simultaneously moving all filters of the respective set toward and away from said inner end positions; and discrete holders for the filters of said sets, said holders being outwardly adjacent to the path of the light beam and the filters being mounted in the respective holders in overhung positions, each of said holders comprising a lever and pivot means for said lever, said pivot means defining for the respective levers pivots axes which are substantially parallel to said direction and each of said levers being a bell crank lever having a first arm which supports the respective filter and a second arm, said devices of said actuating means being operatively connected with the second arms of said levers and each comprising a ring having cam slots and followers provided on the second arms of the respective levers and extending into said cam slots so as to pivot said levers in response to rotation of said ring.

24. Apparatus for continuously coloring a light beam, particularly in a photographic printer wherein a beam of printing light passes in a predetermined direction along a predetermined path toward a plane wherein the beam impinges on photosensitive material, comprising a plurality of sets of discrete filters, said sets being disposed one behind the other, as considered in said direction, and the filters of each set being movable transversely of said path to and from inner end positions in which such filters extend at least substantially across the entire path; discrete actuating means for each of said sets of filters, each of said actuating means comprising a device for simultaneously moving all filters of the respective set toward and away from said inner end positions; and discrete holders for the filters of said sets, said holders being outwardly adjacent to the path of the light beam and the filters being mounted in the respective holders in overhung positions, each of said holders comprising a lever and pivot means for said lever, said pivot means defining for the respective levers pivot axes which are substantially parallel to said direction and each of said levers being a bell crank lever having a first arm which supports the respective filter and a second arm, said devices of said actuating means being operatively connected with the second arms of said levers and each comprising a ring and links articulately connecting said ring with said second arms of the respective levers so as to pivot said levers in response to rotation of said ring.

25. Apparatus for continuously coloring a light beam, particularly in a photographic printer wherein a beam of printing light passes in a predetermined direction along a predetermined path toward a plane wherein the beam impinges on photosensitive material, comprising a plurality of sets of discrete filters, said sets being disposed one behind the other, as considered in said direction, and the filters of each set being movable transversely of said path to and from inner end positions in which such filters extend at least substantially across the entire path; discrete actuating means for each of said sets of filters, each of said actuating means comprising a device for simultaneously moving all filters of the respective set toward and away from said inner end positions; discrete holders for the filters of said sets outwardly adjacent to the path of the light beam and the filters being mounted in the respective holders in overhung positions, said holders being movable substantially radially of the light beam in said path and each of said devices comprising means for reciprocating the respective holders; and support means having ways for said holders, each of said devices comprising a ring having cam slots and follower means provided on said holders and extending into the slots of the respective ring so that, when a ring is rotated, the respective holders move substantially radially of said path.

* * * * *